US011436013B2

(12) United States Patent
Bajaj et al.

(10) Patent No.: US 11,436,013 B2
(45) Date of Patent: *Sep. 6, 2022

(54) METHOD AND SYSTEM FOR DETECTION OF THREAD STALL

(71) Applicant: International Business Machines Corporation, Armonk, NY (US)

(72) Inventors: Omesh Bajaj, Austin, TX (US); Kevin Barnett, Austin, TX (US); Debapriya Chatterjee, Austin, TX (US); Bryant Cockcroft, Austin, TX (US); Jamory Hawkins, Austin, TX (US); Lance G. Hehenberger, Cedar Park, TX (US); Jeffrey Kellington, Pflugerville, TX (US); Paul Lecocq, Round Rock, TX (US); Lawrence Leitner, Austin, TX (US); Tharunachalam Pindicura, Austin, TX (US); John A. Schumann, Austin, TX (US); Paul K. Umbarger, Austin, TX (US); Karen Yokum, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/831,055

(22) Filed: Mar. 26, 2020

(65) Prior Publication Data
US 2020/0225952 A1 Jul. 16, 2020

Related U.S. Application Data

(63) Continuation of application No. 15/850,493, filed on Dec. 21, 2017, now Pat. No. 10,705,843.

(51) Int. Cl.
*G06F 9/46* (2006.01)
*G06F 9/30* (2018.01)
(Continued)

(52) U.S. Cl.
CPC ........ *G06F 9/3009* (2013.01); *G06F 9/30079* (2013.01); *G06F 9/30098* (2013.01);
(Continued)

(58) Field of Classification Search
CPC .......... G06F 15/80; G06F 8/443; G06F 9/526; G06F 9/3865; G06F 9/522; G06F 9/3838;
(Continued)

(56) References Cited

U.S. PATENT DOCUMENTS 5,768,172 A 6/1998 Derby
5,768,500 A 6/1998 Agrawal et al.
(Continued)

OTHER PUBLICATIONS

List of IBM Patents or Patent Applications Treated as Related, dated Mar. 26, 2020, 2 pages.

*Primary Examiner* — Tuan A Vu
(74) *Attorney, Agent, or Firm* — Scully, Scott, Murphy & Presser, P.C.

(57) ABSTRACT

A method of checking for a stall condition in a processor is disclosed, the method including inserting an inline instruction sequence into a thread, the inline instruction sequence configured to read the result from a timing register during processing of a first instruction and store the result in a first general purpose register, wherein the timing register functions as a timer for the processor; and read the results from the timing register during processing of a second instruction and store the results in a second general purpose register, wherein the second instruction is the next consecutive instruction after the first instruction. The inline thread sequence may be inserted in sequence with the thread and further configured to compare the difference between the result in the first and second general purpose register to a programmable threshold.

18 Claims, 5 Drawing Sheets

(51) Int. Cl.
  *G06F 11/07* (2006.01)
  *G06F 9/38* (2018.01)
  *G06F 11/00* (2006.01)
  *G06F 3/00* (2006.01)
(52) U.S. Cl.
  CPC .............. *G06F 9/38* (2013.01); *G06F 9/3836* (2013.01); *G06F 9/3851* (2013.01); *G06F 9/3861* (2013.01); *G06F 9/3869* (2013.01); *G06F 11/00* (2013.01); *G06F 11/07* (2013.01); *G06F 3/00* (2013.01); *G06F 9/30105* (2013.01)
(58) Field of Classification Search
  CPC ...... G06F 1/14; G06F 9/3009; G06F 9/30079; G06F 9/30098; G06F 9/30105; G06F 9/38; G06F 11/00; G06F 11/07; G06F 3/00; G06F 9/3861; G06F 9/3869; G06F 9/3836; G06F 9/3851; H04J 3/0697
  See application file for complete search history.

(56) References Cited

U.S. PATENT DOCUMENTS

| | | | |
|---|---|---|---|
| 6,567,839 B1 | 5/2003 | Borkenhagen et al. | |
| 6,792,446 B2 | 9/2004 | Merchant et al. | |
| 8,151,268 B2 | 4/2012 | Jones et al. | |
| 2006/0259791 A1 | 11/2006 | Dockser | |
| 2007/0006167 A1* | 1/2007 | Luk | G06F 8/443 717/130 |
| 2007/0169002 A1* | 7/2007 | Kronlund | G06F 9/526 717/130 |
| 2007/0220366 A1 | 9/2007 | Bose et al. | |
| 2008/0016327 A1 | 1/2008 | Menon et al. | |
| 2008/0072013 A1 | 3/2008 | Yamamoto et al. | |
| 2009/0249349 A1 | 10/2009 | Bose et al. | |
| 2009/0260013 A1 | 10/2009 | Heil et al. | |
| 2010/0218195 A1* | 8/2010 | Adl-Tabatabai | G06F 9/522 718/107 |
| 2010/0274972 A1* | 10/2010 | Babayan | G06F 9/3838 711/125 |
| 2011/0320858 A1 | 12/2011 | Koktan et al. | |
| 2012/0131309 A1* | 5/2012 | Johnson | G06F 15/80 712/41 |
| 2012/0185734 A1 | 7/2012 | Gilkerson et al. | |
| 2013/0262911 A1* | 10/2013 | Boerger | G06F 1/14 713/502 |
| 2013/0290675 A1 | 10/2013 | Chou et al. | |
| 2015/0332043 A1 | 11/2015 | Russello | |
| 2016/0006526 A1* | 1/2016 | Cho | H04J 3/0697 370/503 |
| 2016/0314055 A1* | 10/2016 | Bagchi | G06F 9/3865 |
| 2017/0139716 A1 | 5/2017 | Caulfield et al. | |
| 2018/0276046 A1 | 9/2018 | Joao et al. | |

* cited by examiner

METHOD AND SYSTEM FOR DETECTION OF THREAD STALL

BACKGROUND

The present invention relates to executions in a processor and more specifically to a method and system to detect a stall in a thread of instructions in a processor.

Modern computer systems typically contain several integrated circuits (ICs), including a processor which may be used to process information in the computer system. The information processed by a processor may include computer instructions that are executed by the processor as well as data, which is manipulated by the processor using the computer instructions. The computer instructions and data are typically stored in a main memory in the computer system.

Processors typically run programs or processes by breaking them down into instructions and executing the instructions in a series of small steps. These processes broken down into a series of small steps may form one or more threads. A thread is a sequence or collection of program instructions that together perform a specific task. A thread may also be referred to as a streams of instructions. The threads may be instruction streams from different parts of the same program executing on the processor, or may be from different programs executing on the processor, or combinations thereof.

In some cases, to increase the number of instructions being processed by the processor (and therefore increase the speed of the processor), the processor may be pipelined. Pipelining refers to providing separate stages in a processor where each stage performs one or more of the small steps, e.g., instructions, necessary to execute a thread, i.e., several instructions are overlapped in execution. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions may issue to the multiple pipelines in parallel and be executed by each of the pipelines in parallel.

Processor designs commonly have more than one hardware thread. The hardware threads while being architecturally independent, often share resources in the processor. For example, registers, execution units, buses and pipelines may be commonly shared. Sharing resources fairly is a difficult challenge. Logic must be developed to arbitrate priority between the threads for access to the shared resources. A difficult problem is determining when one thread's activity is causing another thread to be starved from accessing shared resources. It is relatively easy to detect if a thread is stalled forever as the thread will not make any forward progress and will hang. Detecting cases where a thread is stalled for a significant number of cycles, but then eventually gains access to the resource is more difficult to detect. For example, in processors, the Arithmetic and Logic Unit (ALU) may take a number of cycles, which may include gaining access to data in memory, to perform its operations. Detecting whether or not the thread is stalled in the pipeline, for example, may be more difficult to detect. Detecting and fixing stall conditions will improve the performance of the threads, and the performance of the processor.

SUMMARY OF THE INVENTION

The summary of the disclosure is given to aid understanding of the system, architectural structure and method of detecting thread stall conditions, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the systems, architectural structure and method of operation to achieve different effects.

The present invention generally provides a system and method of checking and/or detecting for a stall in a processor or microprocessor. In one embodiment, a method of determining if a thread of instructions has stalled in a processor is disclosed. The method includes, in one embodiment, determining how many cycles a processor undergoes to complete an instruction, and comparing how many cycles to complete the instruction to a threshold. In one aspect, the threshold is variable and programmable, and the method may be performed by software where preferably an in-line instruction sequence is added to the plurality of instructions of the thread.

In another embodiment, a method of checking for a stall condition in a processor is disclosed. The method in one aspect includes inserting an inline instruction sequence into a thread, the inline instruction sequence configured to read: the result from a timing register (which preferably functions as a timer for the processor) during processing of a first instruction and store the result in a first general purpose register; and read the result from the timing register during processing of a second instruction and store the result in a second general purpose register, wherein the second instruction is the next consecutive instruction after the first instruction. Preferably, the inline sequence is processed by the processor in sequence with the thread. In one aspect, the inline instruction sequence is further configured to compare the difference between the result in the first and second general purpose register to a threshold. The inline instruction sequence optionally may be further configured to subtract the result in the second general purpose register from the result in the first general purpose register and store the value in a third general purpose register, and compare the value stored in the third general purpose register to the threshold.

In another embodiment, a computer program product for checking for stalls in a pipeline of a processor is disclosed, the computer program product comprising a computer readable storage medium having program instructions embedded therewith, the program instructions executable by a processor to cause the processor to perform a method, the method including reading a result from a timebase register and storing the result in a first register during processing of a first instruction of a thread; reading the result from the timebase register and storing the result in a second register during processing of a second, consecutive instruction of the thread; determining a difference in value between the second register and the first register, and comparing the difference to a threshold.

BRIEF DESCRIPTION OF THE DRAWINGS

The various aspects, features and embodiments of the processor, architectural structure and its method of operation, including the method of detecting thread stall conditions will be better understood when read in conjunction with the figures provided. Embodiments are provided in the figures for the purpose of illustrating aspects, features and/or various embodiments of the processor system, architectural structure and method of operation, including the method of detecting a stalled thread, but the claims should not be limited to the precise arrangement, structures, subassemblies, features, aspects, embodiments, methods and devices shown, and the arrangements, structures, subassemblies, features, aspects, embodiments, methods, and devices shown may be used singularly or in combination with other arrangements, structures, subassemblies, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the system, architectural structure and method of operation, however, it will be understood by those skilled in the art that different and numerous embodiments of the system, architectural structure and method may be practiced without those specific details, and the claims and invention should not be limited to the embodiments, subassemblies, features, processes, methods, aspects, features, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Figure 1:
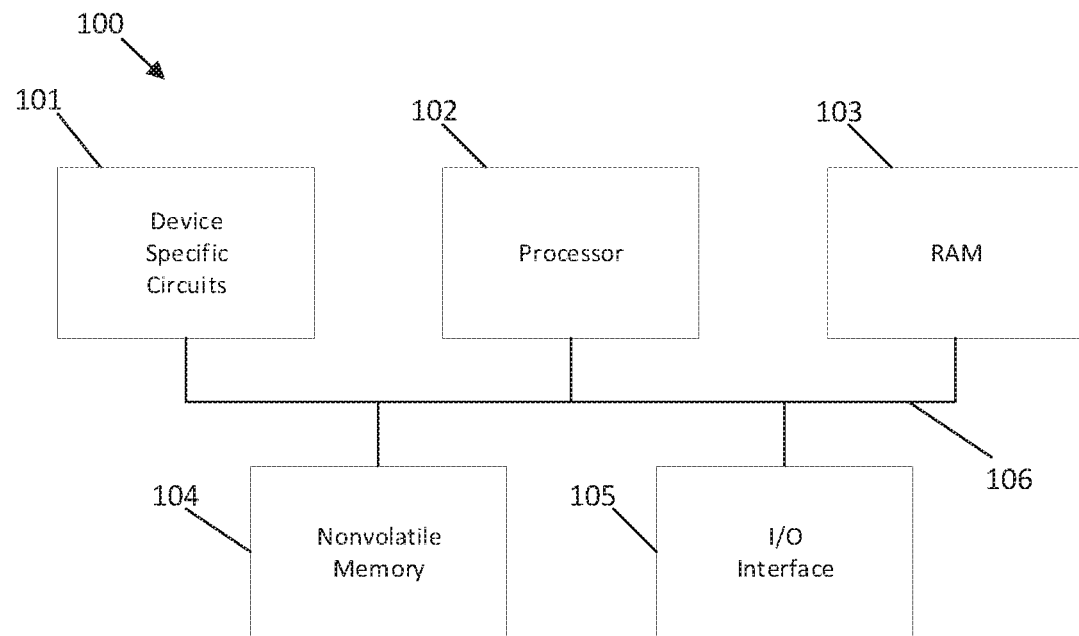
FIG. 1 depicts a general computing or data processing system in accordance with one embodiment.

A computing or data processing system 100 suitable for storing and/or executing program code may take many forms and in one embodiment may include at least one processor 102, which may be or be part of a controller, coupled directly or indirectly to memory devices or elements through a system bus 106, as shown in FIG. 1. Computing system 100 in FIG. 1 is shown with a processor 102, Random Access Memory (RAM) 103, nonvolatile memory 104, device specific circuits 101, and I/O interface 105. Alternatively, or additionally, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
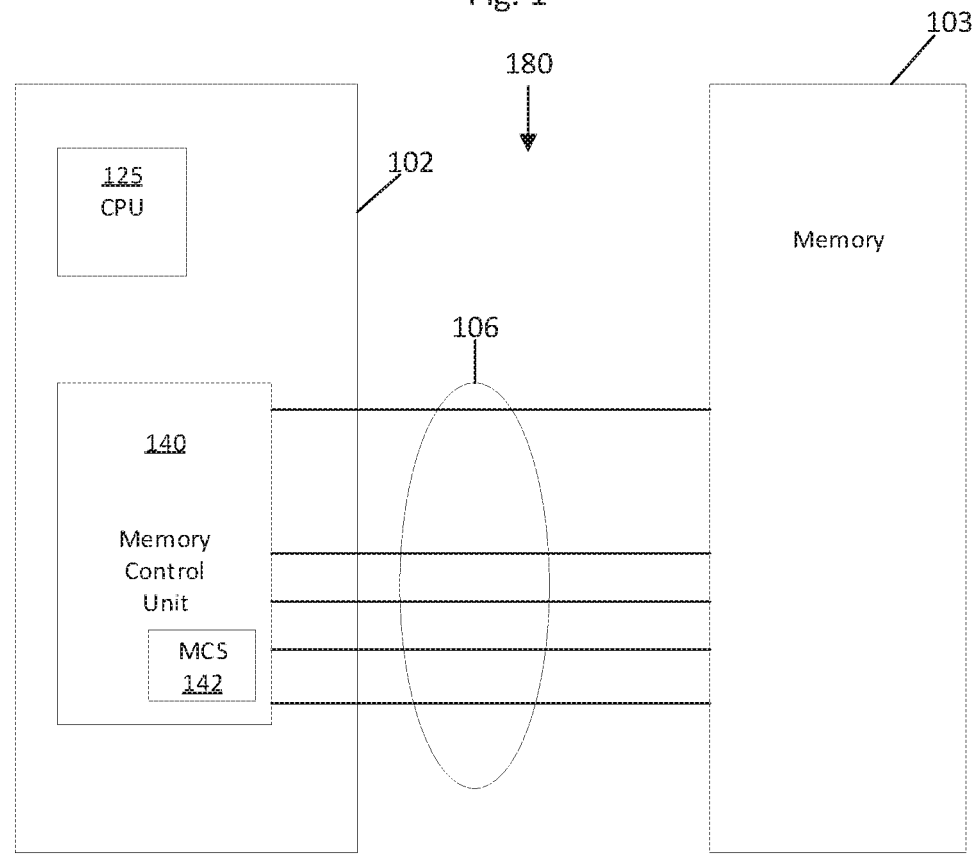
FIG. 2 depicts a processor and memory system according to one embodiment.

FIG. 2 depicts an exemplary processing system 180 that may be part of a larger computer system structure or network. The processing system 180 includes a control processor system or processor 102, which is a processing subsystem that includes at least one processor unit (CPU) or microprocessor 125 that may be configured to interface with a Memory Control Unit (MCU) 140. The processor or CPU 125 may be a module that processes read, write, and configuration requests from a system controller (not depicted). The processor 125 may be a multi-core processor. The MCU 140 may include a memory controller synchronous (MCS) 142, also referred to as a memory controller, that controls communication with one or more memory devices 150, e.g., DRAMs, (not shown in FIG. 2) in a memory subsystem 103. The MCU 140 and the MCS 142 may include one or more processing circuits, or processing may be performed by or in conjunction with the processor 125. The control processor system 102 communicates with the memory subsystem 103 through a communications bus 106.

Figure 3:
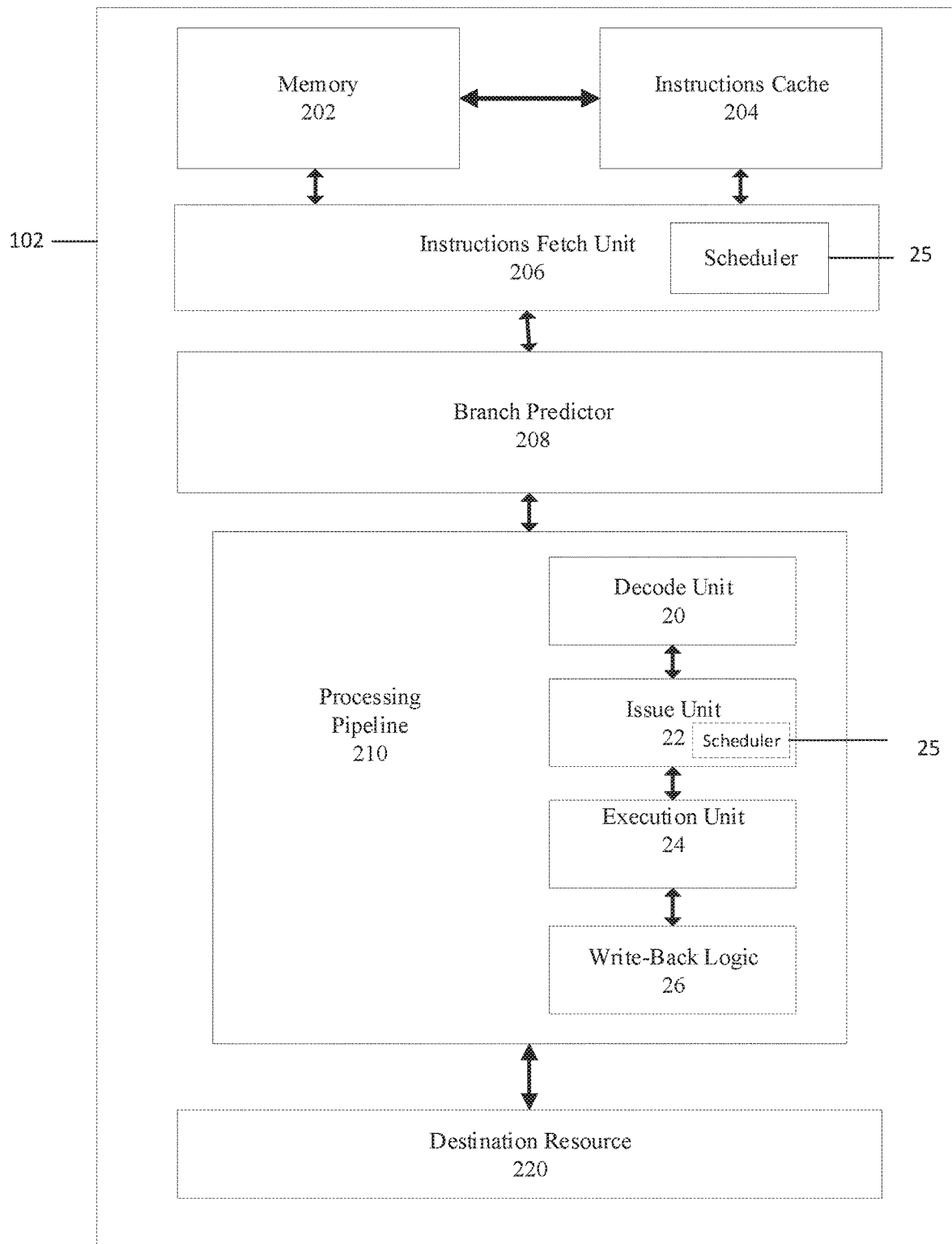
FIG. 3 depicts a block diagram of a processor in accordance with an embodiment.

FIG. 3 depicts a block diagram of a processor 102 according to an embodiment. The processor may be a pipelined processor configured to execute one or more of threads. A thread (also referred to as an instruction stream) comprises a sequence or collection of instructions that together perform a specific task. The threads may be instruction streams from different parts of the same program executing on the processor, or may be from different programs executing on the processor, or combinations thereof. The processor in one embodiment may be a multithreaded processor and may process threads concurrently.

The processor 102, according to one embodiment, may include a memory 202, an instruction cache 204, an instruction fetch unit 206, a branch predictor 208, and a processing pipeline 210. The processor 102 may be included within a computer processor or otherwise distributed within a computer system. Instructions and data can be stored in memory 202, and the instruction cache 204 may access instructions in memory 202 and store the instructions, e.g., the instructions of the various threads, to be fetched in cache memory. The memory 202 may include any type of volatile or nonvolatile memory, such as cache memory. The memory 202 and instruction cache 204 can include multiple cache levels. A data cache (not depicted) may also be included in the processor 102. In one embodiment, instruction cache 204 may be configured to store up to 32 kilobytes of instructions in an 8-way set associative structure. Alternatively, any other desired configuration and size may be employed. For example, instruction cache 204 may be implemented as a fully associative, set associative, or direct mapped configuration. The processor 102 preferably permits multiple threads to share the functional units of the microprocessor 102 (e.g., instruction fetch and decode units, caches, branch prediction units, and execution units) preferably in concurrent fashion.

In FIG. 3, a simplified example of the instruction fetch unit 206 and the processing pipeline 210 are depicted. In various embodiments, the processor 102 may include one or more processing pipelines 210 and instruction fetch units 206. In an embodiment, and for ease of discussion, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. The pipeline may also be broken down and illustrated differently. While a forward path through the processor 102 is depicted in FIG. 3, other feedback and signaling paths may be included between elements of the processor 102.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions. The execution unit 24 may include a plurality of execution units, such as, for example, Arithmetic Logic Units (ALUs) 25, fixed-point execution units, floating-point execution units, load/store execution units, and vector multimedia execution units, to name a few. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data.

In operation, the instruction fetch unit 204 provides instructions to the processing pipeline 210, and, in one embodiment, the fetch unit 204 and/or processing pipeline 210 may include an instruction scheduler 25 or thread scheduler 25. For example, the fetch unit 204 may include scheduler 25, or the issue unit 22 of the processing pipeline 210 may include the scheduler 25, or the scheduler may be separate from the fetch unit 204 or the issue unit 22. Aspects of scheduler 25 may also be contained in instruction fetch unit 204 and issue unit 24 of the processing pipeline 210. For each clock cycle of the processor, the scheduler 25 preferably selects an instruction from one of the threads and issues the instruction to the processor pipeline 210. In embodiments, register files (not shown) and different levels of data caches may be coupled to the execution unit 24. The scheduler 25 and instruction fetch unit 204 may also have register files (not shown) and/or different levels of cache files (not shown) associated therewith.

The execution and completion of the instructions in the pipeline, however, may be stalled for a number of reasons. Stalls, for example, may occur where the processor (e.g., execution unit): waits for data to arrive; waits for access to memory outside the processor, such as due to a cache miss; is processing instructions that are dependent upon other instructions or data; is processing long latency instructions such as a divide instructions, floating point instructions or the like; or has a hardware resource conflict. Detecting and fixing these stall conditions may improve thread performance, and processor performance.

Figure 4:
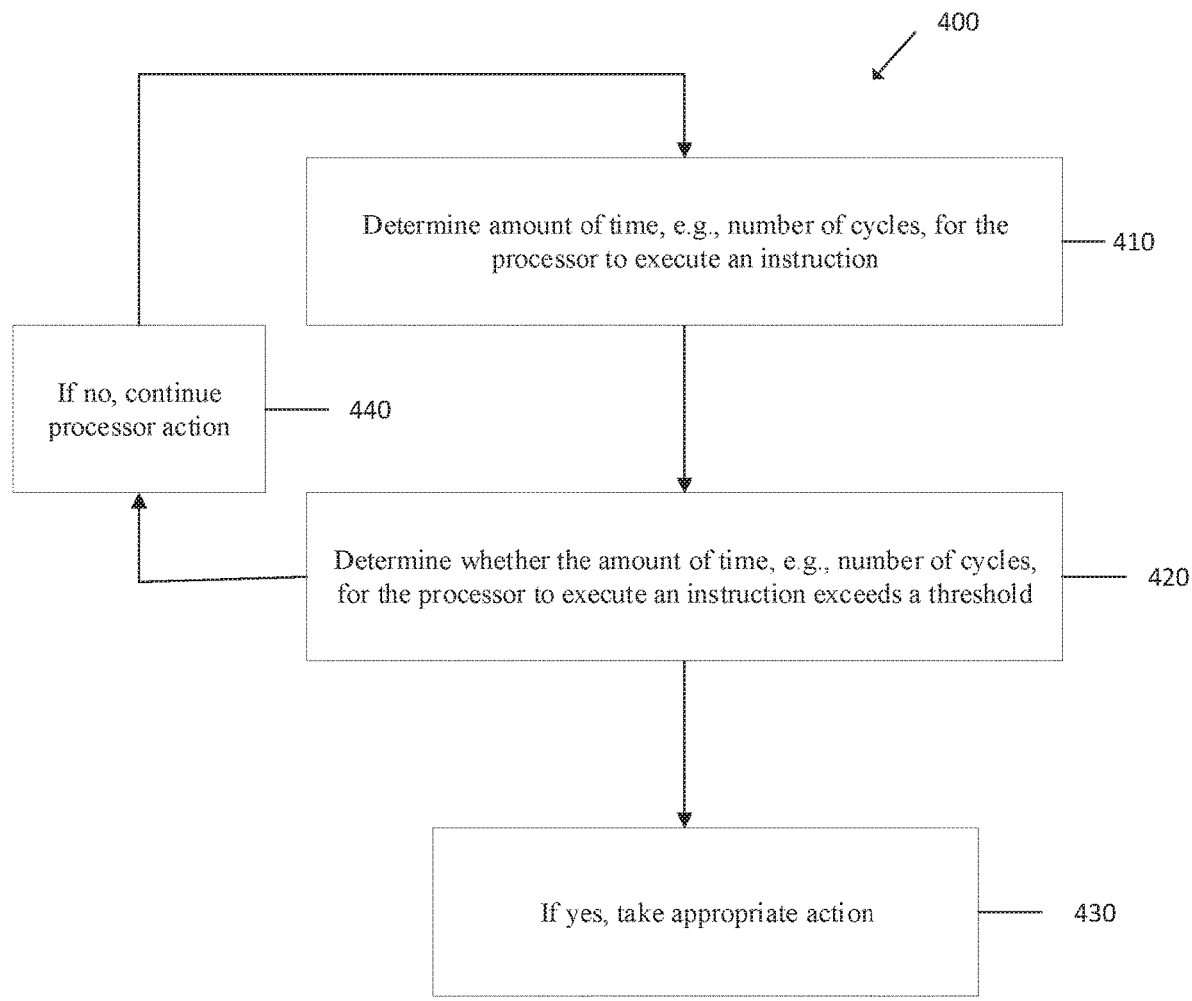
FIG. 4 depicts a flow chart of a method, according to one embodiment, of checking for and/or detecting a stall in the pipeline of a processor.

In one aspect, a method and system to detect cycle windows where a thread is stalled is disclosed. FIG. 4 illustrates an exemplary flowchart in accordance with one embodiment describing a method for checking for and/or detecting a stalled processor, for example a stalled thread of instructions. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, or the steps may be performed in the order disclosed or in an alternate order.

While the illustrative embodiments described above may be implemented in hardware, such as in functional units of a processor, various aspects of the illustrative embodiments preferably may be implemented in software. For example, it will be understood that each block of the flowchart illustration in FIG. 4, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems, which perform the specified functions or steps, or by combinations of special purpose hardware and computer instructions.

Referring to FIG. 4, in one aspect, a method and system 400 to check for and/or detect cycle windows where a processor, e.g., a thread, is stalled is disclosed. At block 410, the amount of time, e.g., the number of cycles of the processor, to execute an instruction is determined. At block 420, whether the amount of time, e.g., the number of cycles, to execute the instruction exceeds a threshold is determined.

One manner of determining whether the amount of time, e.g., the number of cycles of the processor, to execute the instruction exceeds the threshold is to do a comparison. More specifically, the amount of time, e.g., number of cycles, for the processors to execute the instruction can be compared to and/or subtracted from a threshold. In one embodiment, the threshold value can be programmable and can be varied for the instruction being tested.

At block 430, if the threshold is exceeded then appropriate action may be taken. For example, in one embodiment appropriate action may stop the processor, and in another embodiment, the processor may be stopped and debug information can be extracted and examined to determine the cause of the stall. If the threshold is not exceeded, then such data is indicative that a stall has not occurred, and the processor, at block 440, may continue to process information and data.

In one aspect, the method in more detail may include reading a timing register during execution of the first instruction; reading the timing register during execution of a second subsequent instruction; and subtracting the result of the second instruction register read from the result of the first register read. The timing register preferably is a timebase register which increments according to a function of the processor's clock cycle, and wherein the timebase register is read during the first instruction and the result is stored in a first general purpose register; and the timebase register is read during a second, subsequent instruction and the result is stored in second general purpose register, and the result of the second general purpose register is subtracted from the result of the first general purpose register and the result is stored in a third general purpose register. The result in the third general purpose register in one embodiment is compared to a threshold. The threshold preferably is variable and programmable and stored in a fourth general purpose register, and the result in the third general purpose register is subtracted from the result in the fourth general purpose register, and if the result is a positive number a signal is sent to the processor. If a signal is sent to the processor, the processor may be stopped and information on the threads being processed by the processor are examined.

In one embodiment, an in-line instruction sequence on a thread of instructions will check and determine if a processor and/or thread is stalled. The method and system preferably is a software solution that uses existing logic gates, and does not require dedicated hardware. The method and system of detecting stall conditions preferably consumes little area and logic gates on the processor. The advantages are that in one embodiment the method and system may be cheaper to implement, doesn't require verification resources to make sure the logic is correct, and has the flexibility of software instead of building dedicated hardware. This information may be utilized to improve the system.

In one embodiment, a first thread is used to check when other threads in the processor pipeline are causing or experiencing stalls. In this regard, a second thread may stall the execution of the first thread. That is, in one embodiment, when the threshold is exceeded, the process can be stopped and the threads other than the thread that exceeded the threshold can be examined to determine the performance of the other threads and what the other threads were doing. It is recognized that the processor might be stopped after the thread that was checked and/or stalled had cleared the stall, but there is history as to where the other threads are that will indicate what type of code they are executing or they still may be executing that code.

The method and system are simple and efficient. In one embodiment, the processor includes a clock which synchronizes the operations of the processor. The processor clock operates at a certain frequency, which determines how many cycles of operations the processor performs every second. In one example, a processor may run at 2-4 Gigahertz. Processors may run at other cycle speeds. Processors typically have a timebase register that increments when a predetermined fixed number of cycles of the processor are executed. In one example, for every eight (8) clock cycles of the processor, the timebase register is incremented by 1. Thus, the timebase register may function as a counter or timer for the processor.

In one embodiment, a thread can execute instructions to read the timebase register. By reading the timebase register in consecutive instructions, and comparing results, it can be determined how many cycles it is taking to execute an instruction. While the method and system is described with reference to the timebase register it will be appreciated that other timers, clocks, counters, or timing registers may be used to determine the amount of time or duration an instruction or thread, or portions thereof, are running in a processor or the processor's pipeline. By determining how long it is taking an instruction to execute, a check can be implemented so that if it is taking too long to execute an instruction, then action may be taken to check for and detect, and, if appropriate, remedy the stall condition. In one embodiment, the number of cycles it is taking to complete an instruction can be compared to a threshold. The threshold may be determined by the programmer and may be changed for various instructions and in various operating situations. For example, the threshold can be changed to account for the instruction that is being checked. In an aspect, if the number of cycles to complete the instruction exceeds the threshold, then the processor may be stopped, and/or debug information may be extracted, and optionally that information may be examined to determine the cause of the stall.

Figure 5:
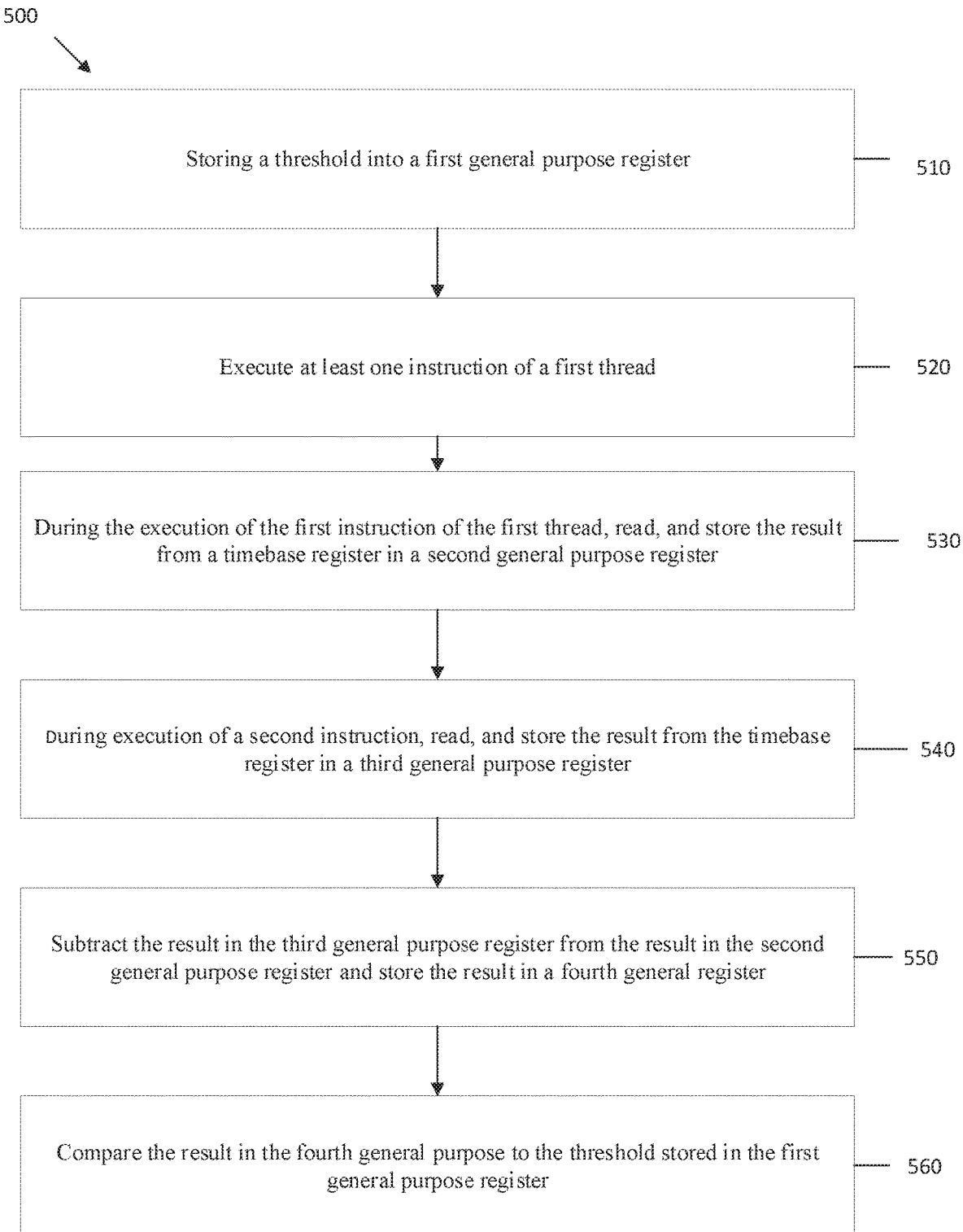
FIG. 5 depicts a more detailed flow chart of a method in accordance with an embodiment of checking for and/or detecting a stalled instruction in a processor.

FIG. 5 illustrates an exemplary flowchart, in accordance with one embodiment, describing a method for checking for and/or detecting a stalled processor, e.g., thread of instructions. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, or the steps may be performed in the order disclosed or in an alternate order.

While the illustrative embodiments described above may be implemented in hardware, such as in functional units of a processor, various aspects of the illustrative embodiments preferably may be implemented in software. For example, it will be understood that each block of the flowchart illustration in FIG. 5, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems, which perform the specified functions or steps, or by combinations of special purpose hardware and computer instructions.

Referring to FIG. 5, a method, according to one embodiment, of detecting and/or checking whether a processor, e.g., a thread in a processor, has stalled is disclosed. At 510, the threshold number of cycles to execute an instruction may be programmed and stored in a general purpose register, e.g., a first general purpose register. The programming of the threshold may take place at other steps or locations in a program. At 520, at least one instruction of a first thread is executed. During execution of the first instruction, at 530, the value from the timebase register is read and stored to a second general purpose register, and during execution of a second instruction, at 540, the value from the timebase register is read and stored in a third general purpose register. The second instruction is preferably the next consecutive, subsequent instruction after the first instruction. The second instruction is from the same thread. Next, at 550, the value in the third general purpose register is subtracted from the value in the second general purpose register and that value is stored in a fourth general purpose register. The value in the fourth general purpose register represents how many cycles have taken place between the execution of the first instruction and the second, subsequent instruction.

The information or value in the fourth general purpose register can be used to determine how many cycles it is taking to execute the instructions in the thread. More specifically, the value in the fourth general purpose register, which represents how many cycles the processor has undergone, can be compared, at 560, to the threshold, programmed into a general purpose register, e.g., the first general purpose register. If the value in the fourth general purpose register, representing how many cycles the instructions in the thread took to process, is greater than the threshold, then the instructions in the pipeline may be stalled and various options may be implemented to determine the course of action as explained above, and also as illustrated in FIG. 4.

In one example, by having the second read be the next instruction, any stalls in any of the pipeline stages will show up as additional value (time) in the timebase register when it completes. There is a minimal amount of time it will take to do the second read. In other words, it will take a certain amount of cycles to fetch, dispatch, issue, execute, and complete the read of the timebase register. Any additional time to complete the second read would be stall time. This stall time may be attributable to what the other threads are doing and how they influence the executing of the second read of the timebase register.

In an embodiment, an in-line instruction sequence is inserted into the thread to check if the processor, e.g., a thread, is stalling. The in-line instruction sequence may be inserted anywhere in the thread of instructions and may be inserted when the thread start-ups, during a critical section of the code, or randomly inserted into the code stream for that thread. Practically, the inline code sequence would be inserted where experience, engineering judgment or evidence indicates the likelihood of a stall. In one embodiment, the code can be inserted into a performance sensitive area of the code. For example, if the processor is running a loop that moves data from one location in memory to another location in memory, the stall detector code can be inserted upon entering the loop the first time, or may be after a 1000 iterations of the loop, or something that is appropriate based upon the instructions being performed. In one example, the in-line instruction sequence is inserted into a thread to look for occurrences when other threads are causing or experiencing stalls.

In one example sequence, a sample code sequence inserted into a thread may comprise:
    move from timebase-→GPR0
    move from timebase-→GPR1
    sub GPR2, GPR1, GPR0
    mr GPR3, threshold
    if (GPR2>threshold)
       then (b fail).

The sequence of instructions, e.g., the timebase reads and the threshold check, may be inserted anywhere in the thread, but as explained above may be inserted where experience, engineering judgment and/or evidence indicates the likelihood of a stall.

Figure 6:
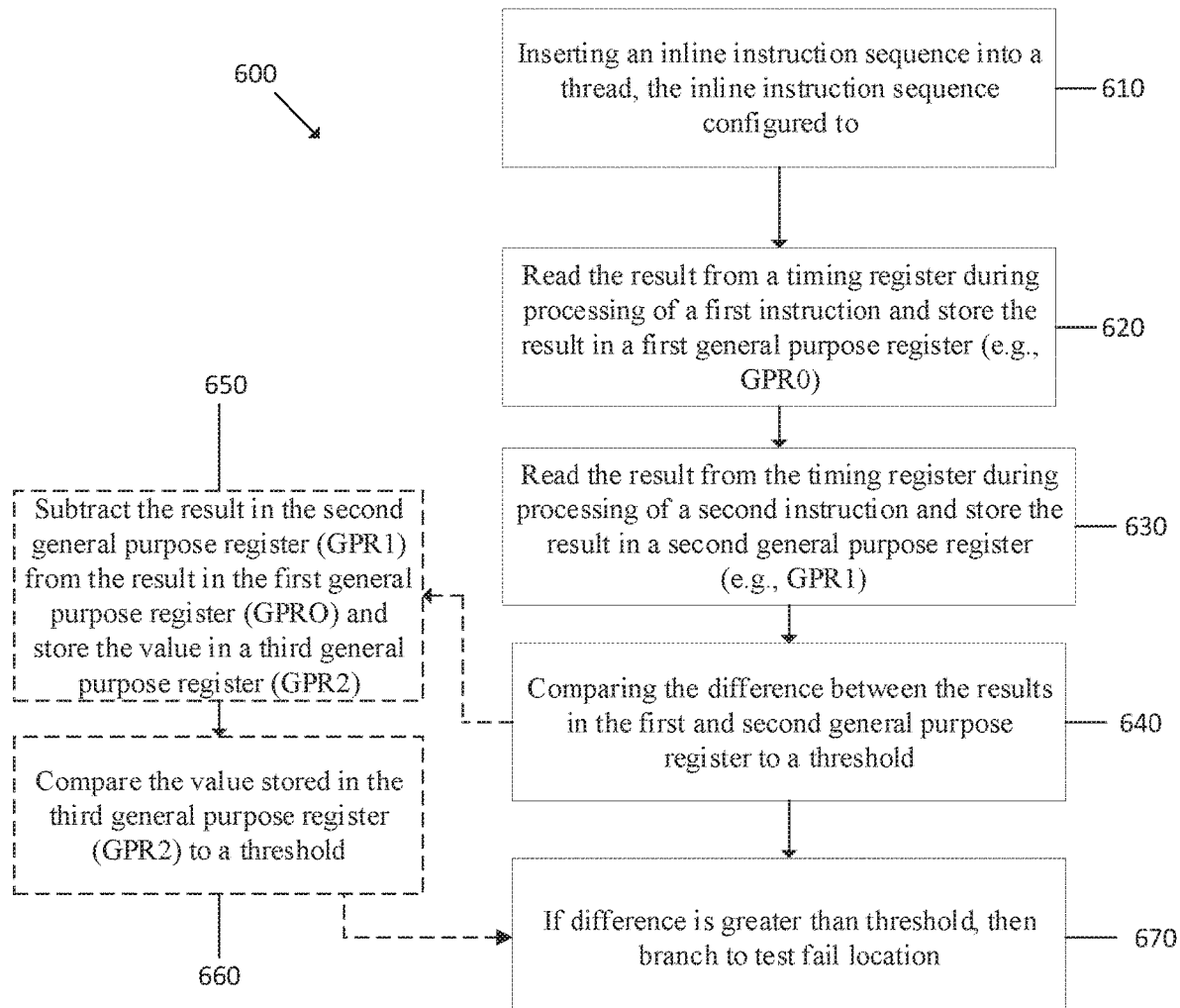
FIG. 6 depicts a flow chart of an embodiment of an inline instruction sequence to check for and/or detect a stall in a processor.

FIG. 6 illustrates an exemplary flowchart in accordance with one embodiment describing a method for checking and/or detecting a stalled processor, e.g., a thread of instructions. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, or the steps may be performed in the order disclosed or in an alternate order.

While the illustrative embodiments described above may be implemented in hardware, such as in functional units of a processor, various aspects of the illustrative embodiments preferably may be implemented in software. For example, it will be understood that each block of the flowchart illustration in FIG. 6, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems, which perform the specified functions or steps, or by combinations of special purpose hardware and computer instructions.

Referring to FIG. 6, a method 600, according to one embodiment, of implementing a check to determine and/or detect a stalled thread is disclosed. At 610, the method includes inserting an in-line instruction sequence into a thread, the in-line instruction sequence configured to be processed by a processor with the thread. The second in-line instruction, at 620, is configured to read a timing register, preferably during processing of a first instruction, and writes/stores the result, e.g., the value, into a register, e.g., a first register, preferably a first general purpose register, GPR0. The timebase would be read during the execution stage of the pipeline. After that instruction completes, the second instruction executes. The second instruction preferably is the next consecutive instruction after the first instruction. This instruction is the same type of instruction as the other timebase read. At 630, the in-line instruction sequence is configured to read the timing register, e.g., timebase register, during the processing of a second instruction, preferably during the execution stage of the pipeline, and stores/writes the result, e.g., value, into a different register, e.g., a second general purpose register, GPR1. In one aspect, the inline instruction sequence is inserted in a first thread and used to determine a stall condition in a second, different thread. In one embodiment, the timing register reads are inserted in performance sensitive areas of the thread. Upon reading and storing the second result from the timing register, the amount of time, duration, or number of clock cycles it took to complete an instruction in a thread can be determined, and that information can be used to determine if a stall has occurred.

In the next step, at 640, the in-line instruction sequence may be configured to compare the difference between the results in the first and second general purpose registers to a threshold. In one embodiment, as shown in more detail at 650 and 660, and as per the sample code sequence, the step 640 may be broken down into further steps. For example, at 650, the result or value stored in the second general purpose register (GPR1), which represents the time at which the read and store of the second, preferably next instruction took place, is subtracted from the result or value stored in the first general purpose register (GPR0), which represents the time when the read and store of the first instruction took place, and that difference result or value is stored in a third register, e.g., third general purpose register (GPR2). The value or result in the third general purpose register (GPR2) represents the time or number of cycles to execute the instruction in the thread. The in-line instruction also preferably stores the threshold value in a general purpose register, e.g., a fourth general purpose register (GPR3). Next, in one embodiment as shown at 660, and per the sample code, the results or value in the third register, e.g., third general purpose register (GPR2) is compared to the threshold, held in and preferably programmed in the fourth general purpose register (GPR3), and if the result or value in the third general purpose register (GPR2) is greater than the threshold, then that information should be indicative of a stall in the processor. Depending upon the programming, at 670, a number of different scenarios can play out using that stall condition information, as explained above.

In one embodiment a computer program product for checking for stalls in a pipeline of a processor is disclosed, the computer program product comprising a computer readable storage medium having program instructions embedded therewith, the program instructions executable by a processor to cause the processor to perform a method, the method including reading a result from a timebase register and storing the result in a first register during processing of a first instruction of a thread; reading the result from the timebase register and storing the result in a second register during processing of a second, consecutive instruction of the thread; determining a difference in value between the second register and the first register, and comparing the difference to a threshold. In one aspect, the threshold is programmable and the computer program product may be configurable as an in-line instruction sequence to be added to a thread. The computer program product may also include instructions to stop the processor if the difference in value between the first and second register exceeds the threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of checking for a stall condition in a processor comprising:
providing an inline instruction sequence configured to: read a result from a timing register during processing of a first instruction, wherein the timing register functions as a timer for the processor, read the results from the timing register during processing of a second instruction, and determine a difference between the result read from the timing register during processing of the first instruction and the result read from the timing register during processing of the second instruction;
inserting the inline instruction sequence into a thread of instructions; and
executing the thread of instructions with the inserted inline instruction sequence,
wherein executing the thread of instructions with the inserted inline instruction sequence comprises:
reading the result from a timing register during processing of a first instruction, reading the result from the timing register during processing of a second instruction, determining a difference between the result read from the timing register of the first instruction and the result read during processing of the second instruction, and using the difference to determine if there is a stall condition in the processor.

2. The method of claim 1, wherein the inline instruction sequence is further configured to:

store the result read from the timing register during processing of the first instruction into a first register;

store the result read from the timing register during processing of the second instruction into a second resister;

subtract the result in the first general purpose register from the result in the second general purpose register and obtain a subtraction result;

store the value of the subtraction result in a third general purpose register; and compare the value stored in the third general purpose register to a threshold.

3. The method of claim 2, wherein the threshold is variable and programmable.

4. The method of claim 1, wherein executing the thread of instructions with the inserted inline instruction sequence comprises comparing the difference between the result read from the timing register during processing of the first instruction to the result read from the timing register during processing of the second instruction; and using the comparison to determine if there is a stall condition in the processor.

5. The method of claim 1, wherein executing the thread of instructions with the inserted inline instruction sequence comprises reading the result from the timing register during processing of the first instruction in the inline instruction sequence and storing the result in a first register; and reading the results from the timing register during processing of the second instruction in the inline sequence and storing the result in a second register.

6. The method of claim 5, wherein the second instruction is the next consecutive instruction after the first instruction.

7. The method of claim 5, wherein executing the thread of instructions with the inserted inline instruction sequence comprises subtracting the result of the first register from the result of the second register to obtain a subtraction result and comparing the subtraction result to a threshold.

8. The method of claim 7, further comprising storing the subtraction result in a third register, and subtracting the subtraction result in the third register from the threshold.

9. The method of claim 8, further comprising sending a signal to the processor that the thread has stalled if subtracting the subtraction result in the third register from the threshold results in a positive number.

10. The method of claim 1, wherein the in-line instruction sequence is inserted into the thread in at least one of the group consisting of at the thread start up, at a performance sensitive area of the thread, and combinations thereof.

11. The method of claim 1, wherein the timing register is the timebase register.

12. The method of claim 1, wherein the inline instruction sequence is inserted in a first thread and used to determine a stall condition in a second, different thread.

13. The method of claim 1 performed by software.

14. A method of determining if a thread has stalled in a processor, the thread comprising a plurality of instructions, the method comprising:

inserting an inline instruction sequence into the thread;

executing the thread with the inserted inline instruction sequence;

determining the amount of time a processor undergoes to complete the inline instruction sequence;

comparing the amount of time to complete the inline instruction sequence to a threshold; and using the comparison to determine if the thread has stalled in the processor.

15. The method of claim 14, wherein executing the thread with the inserted inline sequence comprises:

reading a first result from a timing register during processing of a first instruction in the inline instruction sequence;

reading a second result from the timing register during processing of a second instruction in the inline instruction sequence.

16. The method of claim 15, wherein determining the amount of time a processor undergoes to complete the inline instruction sequence comprises subtracting the first result from the second result to obtain a subtraction result.

17. The method of claim 16, wherein comparing the amount of time to complete the inline instruction sequence comprises subtracting the subtraction result from the threshold, and using the comparison to determine if the thread has stalled in the processor comprises sending a signal indicating that the processor has stalled if subtracting the subtraction result from the threshold is a positive number.

18. A computer program product for checking for stalls in a pipeline of a processor, the computer program product comprising a computer readable storage medium having program instructions embedded therewith, the program instructions configurable as an in-line instruction sequence to be added to a thread and executable by a processor to cause the processor to:

read a first result from a timebase register during processing of a first instruction of the thread;

read a second result from the timebase register during processing of a second, consecutive instruction of the thread;

determine a difference in value between the second result and the first result, and compare the difference to a threshold to determine whether there is a stall in the processor.

* * * * *